United States Patent

Jacyno

[15] 3,703,646
[45] Nov. 21, 1972

[54] ELECTRIC TOOL WITH TRIGGER SWITCH AND LOCK-OUT ARRANGEMENT

[72] Inventor: Anthony Jacyno, Aurora, Ill.

[73] Assignee: G. W. Murphy Industries, Inc., Portable Electric Tool Division, Houston, Tex.

[22] Filed: Dec. 11, 1970

[21] Appl. No.: 97,306

Related U.S. Application Data

[63] Continuation of Ser. No. 800,526, Feb. 26, 1969, abandoned.

[52] U.S. Cl. ............... 310/47, 200/1 V, 200/50 R, 200/50 C, 200/157
[51] Int. Cl. ............................................. H02k 11/00
[58] Field of Search ......... 310/47, 50, 68 R; 200/157, 200/1 V, 50 R, 50 C

[56] References Cited

UNITED STATES PATENTS

| 2,807,732 | 9/1957 | Kurtovich | 200/157 X |
| 3,462,623 | 8/1969 | Batson et al. | 310/50 |
| 3,344,291 | 9/1967 | Pratt | 310/50 |
| 2,876,369 | 3/1959 | Doerner | 310/50 X |
| 3,588,411 | 6/1971 | Milcoy | 200/157 |
| 3,422,296 | 1/1969 | Frank | 200/157 X |
| 2,936,349 | 5/1960 | Johson | 200/50 C |
| 3,467,801 | 9/1969 | Matthews | 200/1 V X |
| 2,711,461 | 6/1955 | Happe | 200/157 |
| 3,373,301 | 3/1968 | Black | 200/157 X |
| 3,376,402 | 5/1968 | Bednarski | 200/157 |
| 3,260,827 | 7/1966 | Frenzel | 200/157 |

*Primary Examiner*—J. D. Miller
*Assistant Examiner*—Mark O. Budd
*Attorney*—Hofgren, Wegner, Allen, Stellman & McCord

[57] ABSTRACT

The disclosure describes a portable electric tool having an on-off trigger switch and a motor reversing switch. The actuators for the two switches are so interlocked as to prevent the tool from being reversed while the tool is running. The tool housing has a separate integral cavity adjacent to the moving parts of the tool, such as the motor, for containing wires or solid state control devices and positively protects said wires or devices against physical or mechanical damage from the motor or related parts.

3 Claims, 8 Drawing Figures

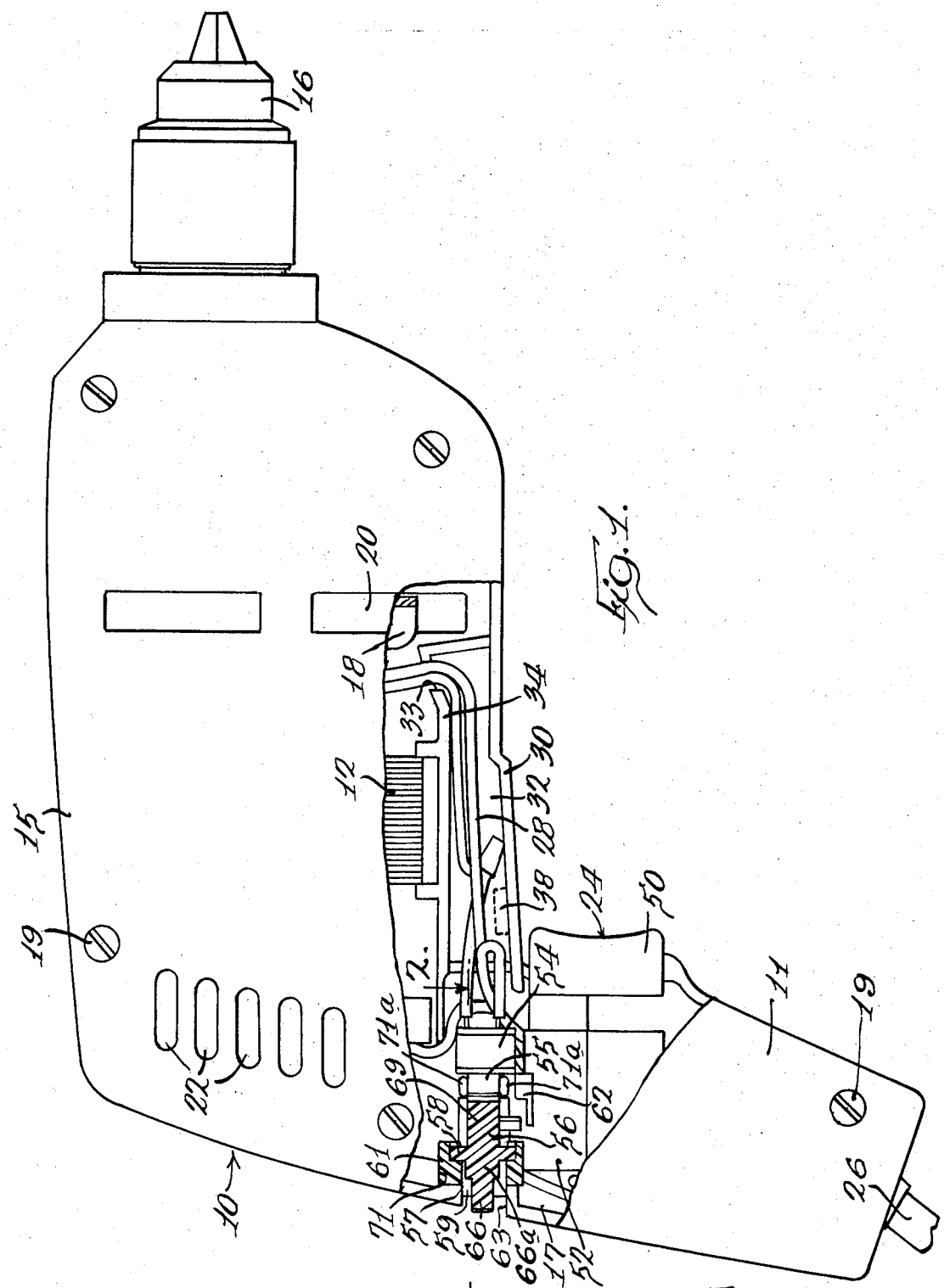

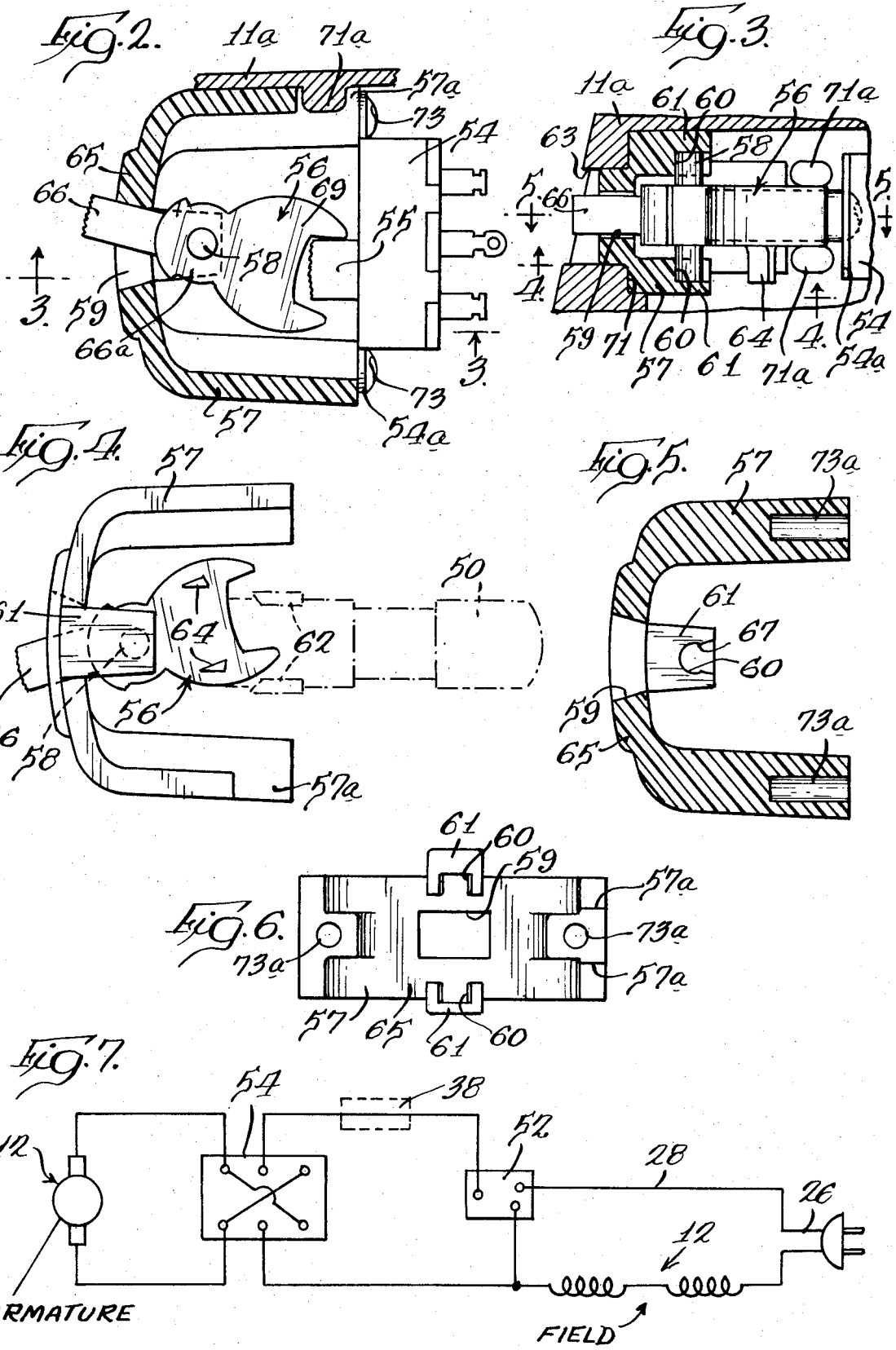

3,703,646

ELECTRIC TOOL WITH TRIGGER SWITCH AND LOCK-OUT ARRANGEMENT

CROSS-REFERENCE

This application is a continuation of my commonly assigned, copending application Ser. No. 800,526, filed Feb. 26, 1969, and entitled "Electric Toll."

FIELD OF THE INVENTION

This invention relates to electric power tools and especially to such tools having reversible motors and related moving parts.

SUMMARY OF THE INVENTION

The present invention provides a new and useful electric power tool having a housing which contains a motor for driving the power tool. In one aspect of the invention, the motor is a reversible motor and is turned on and off by a trigger switch in a handle portion of the housing. A two-way reversing switch is provided with an actuator which is movable from either a forward or reverse position depending on the direction in which the motor is to drive. The reversing switch actuator and the trigger switch actuator are interlocked so that the reversing switch cannot be moved while the trigger switch is on.

In another aspect of the invention, the housing of the tool is provided with an integral cavity means for protecting wires, solid state devices, and the like from physical or mechanical damage by the motor or the moving parts of the tool.

While this invention is susceptible of embodiment in many different forms, there is shown in the drawings and will herein be described in detail a specific embodiment of the invention with the understanding that the present disclosure is to be considered as an exemplification of the principles of the invention and is not intended to limit the invention to the embodiment illustrated.

DESCRIPTION OF THE DRAWINGS

FIG. 1 is an elevational view of an electric tool, in this case a drill, with parts broken away and in section, showing a preferred form of the invention;

FIG. 2 is a cross-sectional view of the motor reversing switch and supporting frame taken on the line 2—2 of FIG. 1 with parts broken away;

FIG. 3 is a cross-sectional view of the motor reversing switch taken on the line 3—3 of FIG. 2;

FIG. 4 is a view similar to FIG. 2, only showing the relationship of the reversing switch to the trigger switch and as a view along the line 4—4 of FIG. 3 with the housing removed;

FIG. 5 is a cross-sectional view taken along the line 5—5 of FIG. 3 of the frame for holding the reversing switch, only with the switch removed;

FIG. 6 is a front view of the frame of FIG. 5;

FIG. 7 is a wiring diagram for a reversible tool incorporating the reversing switch and trigger switch of FIG. 1.

DESCRIPTION OF THE PREFERRED EMBODIMENT

Figure 8:
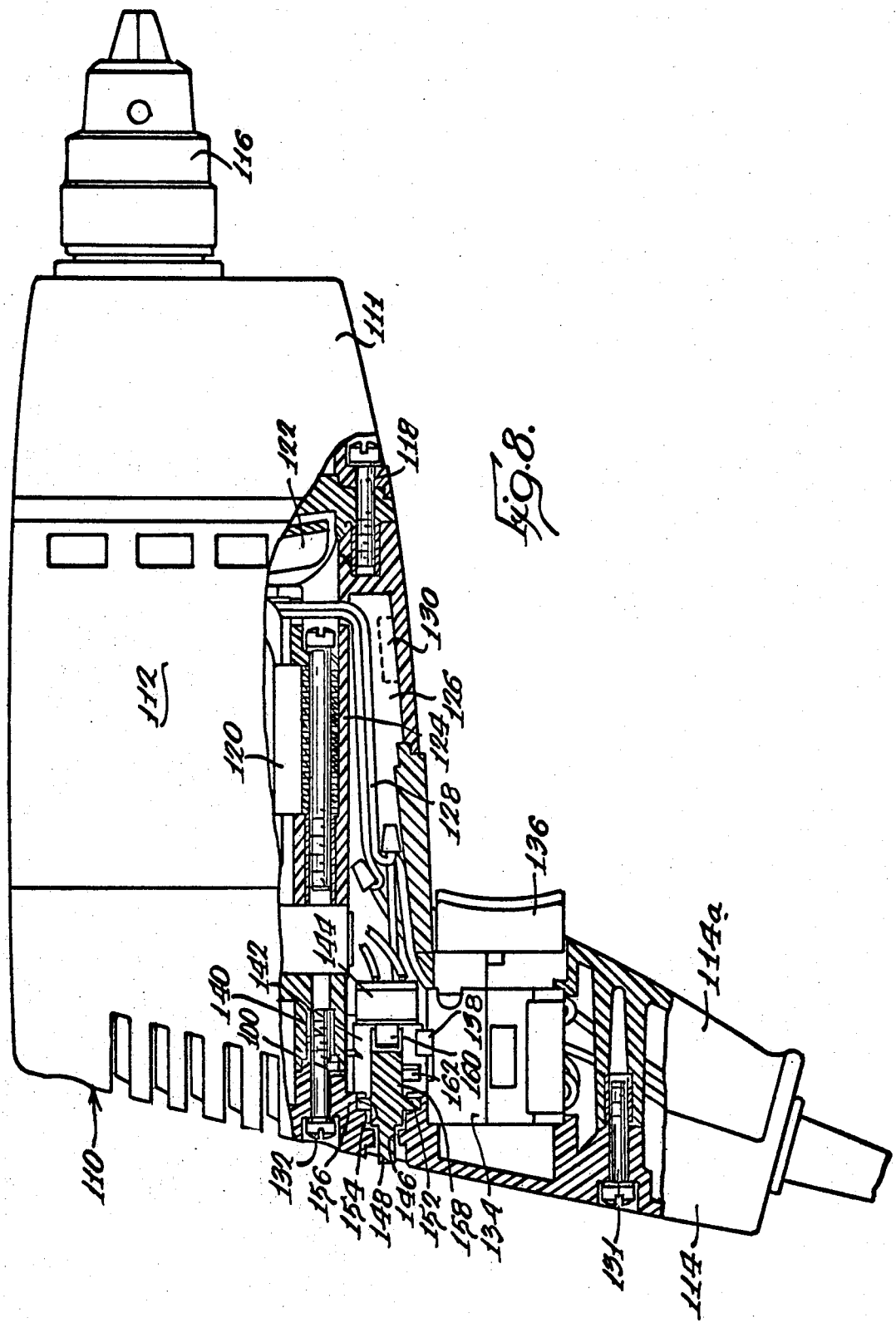
FIG. 8 is a modified form of tool housing incorporating the invention and having parts broken away and in section.

Referring first to FIG. 1, there is illustrated a portable electric drill having a housing 10 with a motor 12 and drive system (not shown) mounted therein in usual manner. A chuck 16 on the outside of the housing 10 is driven by motor 12 through the gear drive system (not shown). A ventilating fan blade 18 is secured to the motor shaft to pull air through vents 20 and exhaust air from vents 22 during operation of the motor for the purpose of removing heat from the housing interior.

Housing 10, as illustrated, is known as a split housing design although it could be a stacked housing design such as shown in FIG. 8, and includes a handle portion 11 having a trigger switch device 24 mounted therein in normal manner. A power cord 26 supplies power through the switch device to the motor via appropriate wiring 28. In the split housing design, the housing is split along a vertical plane to divide the housing into two halves 15 and 17 which are secured together by screws 19. In the usual manner, the motor, transmission and various operative parts are secured in the one half 17 of the housing with the top half 15 being secured thereon to enclose the parts.

As shown, the central portion of the housing has a bottom wall 30 which has an intermediate wall or barrier member 34 spaced interiorly therefrom to form a container or cavity 32 in the housing. The inside of said cavity 32 is protected from the moving parts of the motor 12, fan 18 and gear means by the barrier member 34 so that any elements in the cavity 32 are protected from any physical or mechanical damage which may result from malfunctioning of the moving parts of the tool. The housing 10 and the intermediate wall 34 are formed of a cast metal, such as aluminum, or of plastic of the high impact type in common use today. Materials, such as polycarbonate, which have insulating qualities as well as impact qualities, are typical of the type that may be used for the housing 10. The cavity 32 which can be located at any position within the central portion of the housing, not necessarily the bottom position illustrated, may contain wires such as the wires 28 and/or a solid state electronic control device such as device 38 which can be used for the purpose of controlling the speed of the drill. The wires 28 exit from the cavity 32 by appropriate openings 33 in the wall 34 of the cavity.

The trigger switch device 24 includes an actuator in the form of a trigger 50 slidably mounted in handle 11 of the housing 10 for operating an on-off switch 52 for controlling the motor. Referring to FIGS. 1–6, a reversing switch 54 is mounted in a frame 57 above the on-off switch 52. Switch 54 is of the type having a pivoted actuating element 55 which can be moved between either of two lateral "on" positions. With element 55 in one of the lateral "on" positions, the motor 12 drives in one direction, but the motor is reversed by movement of element 55 to the other lateral "on" position.

The switch 54 is provided with an accessible actuator 56 which is likewise mounted in the mounting frame 57. The actuator 56 has a handle portion 66, a body portion 66a and a bifurcated end portion 69. A pin 58 is fixed in the body portion and projects from both sides thereof into pivoting relationship in undercut bores 60 in the support lugs 61 of the frame 57. The actuator 56 includes the projecting handle portion 66 extending through opening 59 in frame 57 and through opening 63 in the handle 11 of the housing 10. The mounting frame 57 is made of plastic and, as best seen in FIG. 2, 4 and 5, has a general U-shape with the support lugs 61 being spaced apart and projecting from the base 65 of the U into the area between the parallel sides of the U. The bores or openings 60 in the lugs 61 are undercut to provide a restricted neck 67 between the bore 60 and the outer walls of the lug whereupon the ends of the pin 58 snap past the restricted neck 67 and into the openings 60 so that the pin 58 and the actuator 56 are free to pivot about the axis of the pin.

Tongs 54a on the switch 54 have screws 73 passing therethrough into the mounting holes 73a in the end portions of the sides of the frame 57 for securing the switch 54 in the frame 57 and for positioning the switch actuating element 55 in the opening in the bifurcated end 69 of the actuator 56. With the bifurcated end 69 of actuator 56 receiving element 55 of switch 54 between its branches, it becomes possible to move the element 55 between its forward or reverse positions by pivoting actuator 56 about the axis of pin 58 through pressure on the exposed portion 66 in the required direction. The frame 57 with the actuator 56 and switch 54 assembled therewith as a unit is positioned in the handle 11 by pressing the frame 57 into the cavity 71 in the inside of the housing 10 so that the portion 66 of the actuator projects out through the opening 63 in the handle. Projections 71a in the housing half 17 extending from the walls of the cavity 71 coact with the undercut portion 57a in the top and bottom outer portions of the legs of the U of the frame 57 for holding switch 54 and its actuating frame 57 trapped in the housing cavity until the other half 15 is assembled to completely secure the switch 54 and frame 57 in position.

Trigger 50 has a pair of upstanding blocking ears 62 (FIGS. 1 and 4) and actuator 56 has a pair of depending blocking lugs 64. As best seen in FIG. 4, when actuator 56 is moved to one of its two positions to set switch 54 in either a forward or a reverse actuating position, lugs 64 on actuators 56 are pivoted to one side or the other with respect to the position of the line of movement of ears 62 on the switch 52 so that when the trigger 50 is depressed into the "on" position, the ears 62, which move linearly with said trigger 50, will move into a blocking location relative to the lugs 64 whereby the actuator 56 can not be moved until the trigger switch 50, 52 is released and the motor stops running in the designated direction.

So long as switch 52 remains depressed, actuator 56 cannot be pivoted away from the selected forward or reverse position and especially cannot be accidentally pivoted to move switch 54 to its other direction of rotation position and reverse the motor while running. An attempt to pivot actuator 56 to the other direction of rotation position results in the side surfaces of lugs 64 bearing against the side surface of ears 62 thereby blocking the pivotal movement.

FIG. 7 illustrates a suitable wiring diagram for use in the device showing control of the motor, armature and field by switches 52 and 54 to provide a reversible power tool. A suitable solid state speed control 38 is shown in phantom.

FIG. 8 illustrates another form of the invention in conjunction with a stacked housing design. The housing 110 has a forward end portion 111, an intermediate barrel portion 112 and a handle portion 114. The end portion 111 contains the gear train (not shown) and supports the chuck member 116 and is fastened to the end of the barrel portion 112 by means of screws 118. The barrel portion 112 contains the motor 120 and fan 122 and has the intermediate barrier member or wall 124 thereacross to provide a cavity 126 therein for housing wires 128 or solid state devices 130. The handle portion 114 has the front of the hand grip portion 114a removable therefrom by screw 131 with the whole handle portion 114 being secured to the barrel portion 112 by screws 132.

The housing 110 can be made of various materials but in the illustrated form the end portion 111 is of cast metal such as aluminum with the barrel portion 112 and handle portion 114, 114a being of the electrical insulating and high impact plastic material mentioned with respect to FIG. 1.

In the handle portion is mounted a trigger switch 134 having an actuator 136 and the upwardly extending blocking ears 138 connected to the actuator 136 for linear movement therewith. A frame 140, which is of the same general U-shape as frame 57 of the form of invention shown in FIGS. 1–6, is molded as an integral part of the handle 114 and has side legs 142 to which the reversing switch 144 is secured as by screws (not shown) in the same manner as with the modification of FIG. 1. An opening 146 is molded in the handle 114 through which the actuating handle 148 of the actuator 150 projects. The actuator 150 is pivoted in the open portion of the U-shaped frame 140 by means of the pins 152 seated in the undercut openings 154 of the projections 156 from the integral frame 140, once again in the same fashion as described with respect to the form of invention shown in FIGS. 1–6. The actuator 150 has a bifurcated portion 158 which embraces the pivotal operating element 160 of the reversing switch 144.

A pair of depending lugs 162 project downwardly from the bifurcated portion 158 of actuator 150 in a position to lie on either one side or the other of the ears 138 on the trigger 136 so as to prevent actuation of the actuator 150 when the motor is running in either a forward or a reverse direction of rotation. The operation and functioning of the actuator 150 for the reversing switch 144 with respect to the switch 134 is the same as that described with respect to actuator 56, reversing switch 54 and switch 24 and will not be repeated here.

I claim:

1. A portable electric power tool having a housing containing a motor portion and a handle portion, a tool holder rotatable in said housing, said handle portion being generally perpendicular to the axis of the tool holder and having an on-off switch for controlling the motor, a trigger for operating said on-off switch, a frame member carried by said housing, a reversing switch mounted on said frame member and having a movable element for setting the motor for forward or reverse rotation, a movably mounted actuator carried by said frame member and engageable with said movable element of said reversing switch to move said movable element and thereby reset said reversing switch, said actuator extending from the handle on the side thereof opposite said tool holder, said reversing switch being generally between said on-off switch and said trigger, and means on said actuator coacting with means on said on-off switch to prevent actuation of said reversing switch while said trigger is in the "on" position, said actuator comprising first blocking means extending toward said on-off switch, and second blocking means on said on-off switch extending toward and engaging with said first blocking means on said actuator for blocking said actuator against movement when the trigger is is in the "on " position thereby preventing reversing the direction of rotation of the motor, said second blocking means being in unblocking position with respect to the first blocking means when said on-off switch is in the "off" position, said first blocking means on said actuator comprising a pair of lugs depending from the bottom of the actuator and the second blocking means on the trigger switch comprises a pair of ears upstanding from the top of the trigger switch, said ears lying in the path of said lugs when the trigger switch is in the "on" position to block movement of said actuator.

2. The device of claim 1 wherein said trigger is slidably mounted and said actuator is pivotally mounted on said frame member about a vertical axis above said trigger.

3. The device of claim 1, wherein said depending lugs are of proper shape to unblock the trigger on movement of the actuator to an unblocking position in either of the two "on" positions thereby permitting a movement of the trigger switch to "on" position, said ears on said trigger with the trigger switch in "on" position moving with the trigger to a position blocking movement of said actuator by engagement with the actuator lugs.

* * * * *